United States Patent [19]

Hirano

[11] 4,429,951
[45] Feb. 7, 1984

[54] SPECTACLES FOR GIVING TWO-DIMENTIONAL TELEVISION OR MOTION PICTURES THREE-DIMENSIONAL APPEARANCE

[76] Inventor: Kichinosuke Hirano, 35-5 Kita-Karasuyama, 4-chome, Setagaya-ku, Tokyo, Japan

[21] Appl. No.: 175,858

[22] Filed: Aug. 6, 1980

[30] Foreign Application Priority Data

Dec. 5, 1979 [JP] Japan ................................. 54-157877

[51] Int. Cl.³ ........................ G02B 27/22; G02C 7/08
[52] U.S. Cl. ....................................... 350/144; 351/57
[58] Field of Search ............... 350/132, 133, 145, 144, 350/139; 351/28, 29, 57

[56] References Cited

U.S. PATENT DOCUMENTS

| | | | |
|---|---|---|---|
| 6,246 | 4/1849 | Shaw ..................................... | 351/57 |
| 749,046 | 1/1904 | Folmer et al. ....................... | 350/139 |
| 2,258,903 | 10/1941 | Mitchell .............................. | 350/144 |
| 3,970,361 | 7/1976 | DiMatteo ............................ | 350/144 |

OTHER PUBLICATIONS

Bugbee; L. W. et al.; *Bifocals;* One Piece Bifocal Lens Co.; Indianapolis, Indiana; 1922.

*Primary Examiner*—John K. Corbin
*Assistant Examiner*—Scott J. Sugarman
*Attorney, Agent, or Firm*—Wenderoth, Lind & Ponack

[57] ABSTRACT

Spectacles for giving a two-dimensional picture a three-dimensional appearance. The spectacle frame has two refracting lenses mounted therein for pivotal movement around vertical axes through equal angles in opposite directions. The spectacles have arms attached to the lenses with toothed wheels between them for driving the arms in the opposite directions, one of the arms being driven by an adjusting head accessible by the wearer of the spectacles. The spectacles can have bows thereon for wearing in a conventional manner or can have clips for attachment to conventional spectacles.

6 Claims, 5 Drawing Figures

SPECTACLES FOR GIVING TWO-DIMENTIONAL TELEVISION OR MOTION PICTURES THREE-DIMENSIONAL APPEARANCE

BACKGROUND OF THE INVENTION AND PRIOR ART

The present invention relates to spectacles by which two-dimensional pictures on a Braun tube of a television set or projected on a movie screen are given a three-dimensional appearance.

Various ways have already been proposed and developed for making a two-dimensional picture appear to be three-dimensional, but all of these conventional ways comprise specially treating the pictures or providing special projecting devices and special spectacles to give the pictures a three-dimensional appearance. These proposals, however, have not gained wide popularity because they are quite complicated.

OBJECTS AND BRIEF SUMMARY OF THE INVENTION

The object of the present invention is to provide spectacles by which two-dimensional pictures, such as ordinary television pictures and motion pictures projected by ordinary means, can be given a three-dimensional appearance.

Another object of the present invention is to provide such spectacles which have clips by which the spectacles can be mounted on the frames of ordinary spectacles, so that people who wear ordinary spectacles can also use the spectacles of the present invention.

These objects are achieved by providing spectacles for giving a two-dimensional picture a three-dimensional appearance in which a spectacle frame has two refracting lenses mounted therein for pivotal movement around vertical axes through equal angles in opposite directions. The spectacles have arms attached to the lenses with toothed wheels between them for driving the arms in the opposite directions, one of the arms being driven by an adjusting head accessible by the wearer of the spectacles. The spectacles can have bows thereon for wearing in a conventional manner or can have have clips for attachment to conventional spectacles.

BRIEF DESCRIPTION OF THE DRAWINGS

The invention will now be described in greater detail in connection with the accompanying drawings, in which.

DETAILED DESCRIPTION OF THE INVENTION

Figure 1:
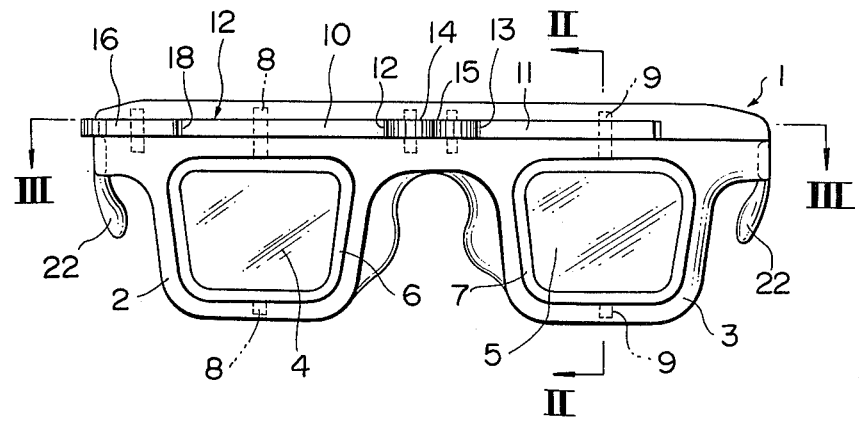
FIG. 1 is a front elevation view of the spectacles in accordance with the present invention.

The spectacles of the present invention have a frame 1, refracting lenses 4 and 5 mounted in a pair of rims 2 and 3 in such a manner that the angular positions around a vertical axis can be changed. To this end, the refracting lenses 4 and 5 are respectively mounted in lens frames 6, 7 and pins 8 and 9 are provided at the top and bottom of the lens frames 6 and 7 and freely pivotally mounted in the rims 2 and 3. The refracting lens 4 and 5 in the lens frames 6 and 7 are thus pivotally supported by the pins 8 and 9 in the spectacle frame 1. A groove 12 extends longitudinally through the frame 1 from one end thereof and above the rims 2 and 3, and arms 10 and 11 are positioned in the groove 12 and are fixed to the upper ends of the pins 8 and 9 of the lens frames 6 and 7 respectively. The arms 10 and 11 each have gear teeth 12 and 13 at the opposed inner ends thereof and these teeth form a part of a toothed wheel. Toothed wheels 14 and 15 are rotatably mounted in the groove 12 between the arms 10 and 11 and the teeth therein mesh with the teeth 12 and 13 on the arms 10 and 11 and they also mesh with the teeth on the other wheel. Thus, as one of the arms 10 and 11 is turned to turn the lens frames 6 and 7, the two toothed wheels 14 and 15 between the arms cause the other of the frames 6 and 7 to be turned in the opposite direction. Thus, when one of the frames 6 and 7 is turned towards the inside relative to the center of the spectacle frame 1, the other is also turned toward the inside in the same manner.

The groove 12 in the spectacles frame 1 is open at one end theeof, and an adjustment head 16 is rotatably mounted on a shaft in the vicinity of the open end of the groove 12. Teeth 17 are provided at the end of the adjustment head 16 extending into the groove end are engaged with teeth 18 formed at the end of the arm 10 which faces the open end of the groove 12. The other end of the head 16 has fine serrations 19 thereon which protrude from the spectacle frame 1 for being engaged by the finger of a wearer to turn the head 16. When the adjustment head 16 is turned the arm 10, the toothed wheel 14, the toothed wheel 15, and the arm 11 are also rotated and the arms 10 and 11 are turned the same amount in opposite directions.

Further, in order to regulate the amount of the adjustment head 16 can turn to ensure stable operation, an arcuate slot 20 concentric with the shaft of the adjustment head 16 is provided in the head, and a pin 21 mounted on the spectacle frame 1 extends loosely into the arcuate slot 20. The adjustment head 16 can turn only to the limits of the slot 20, and this accordingly limits the angle to which the lens frames 6 and 7 can be turned.

Bows 22 are hinged to both ends of the spectacles frame 1 by hinges.

Figure 2:
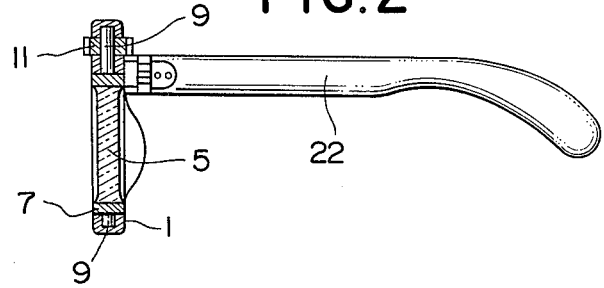
FIG. 2 is a sectional view taken on line II—II of FIG. 1.
Figure 3:
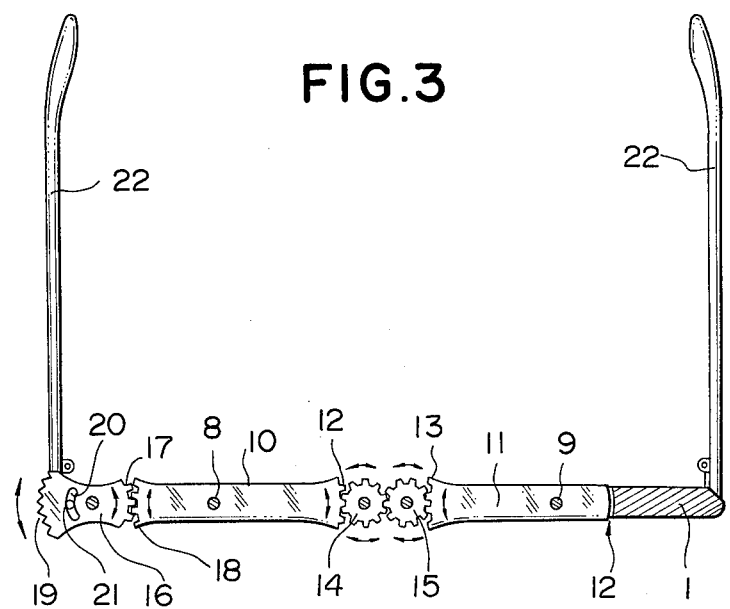
FIG. 3 is a sectional view taken on line III—III of FIG. 1.
Figure 4:
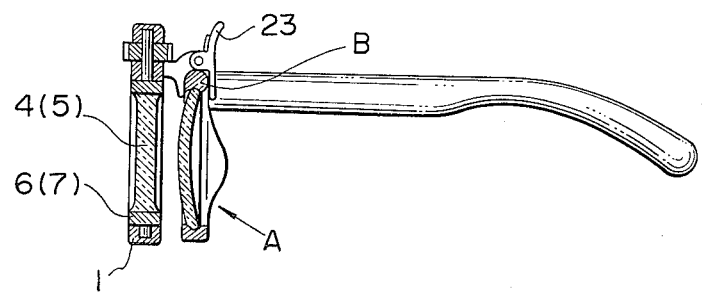
FIG. 4 is a sectional view similar to FIG. 2 of another embodiment of the present invention, and showing the spectacles of the present invention mounted on a pair of ordinary spectacles.

The embodiment of FIG. 4 differs from that of FIGS. 1–3 in that the bows 22 are omitted and instead clips 23 are provided for mounting the spectacles of the present invention on a frame B of ordinary spectacles A.

The three-dimensional spectacles constructed as described above are worn in the same manner as ordinary spectacles and as the light which passes through the refracting lenses 4 and 5 enters the eyes of the wearer, objects in a two-dimensional picture are projected to the eyes as though they were at different positions.

Three-dimensional objects are recognized as being three-dimensional due to the parallax effect produced by the object at the two eyes, but two-dimensional pictures or images do not produce such a parallax effect. When, however, the position of a two-dimensional image projected to the eyes is moved to the right and left by the refracting lenses 4 and 5 which are turned symmetrically inwardly, an effect similar to parallax is produced, and thus even a two-dimensional image has the appearance of a three-dimensional one.

Figure 5:
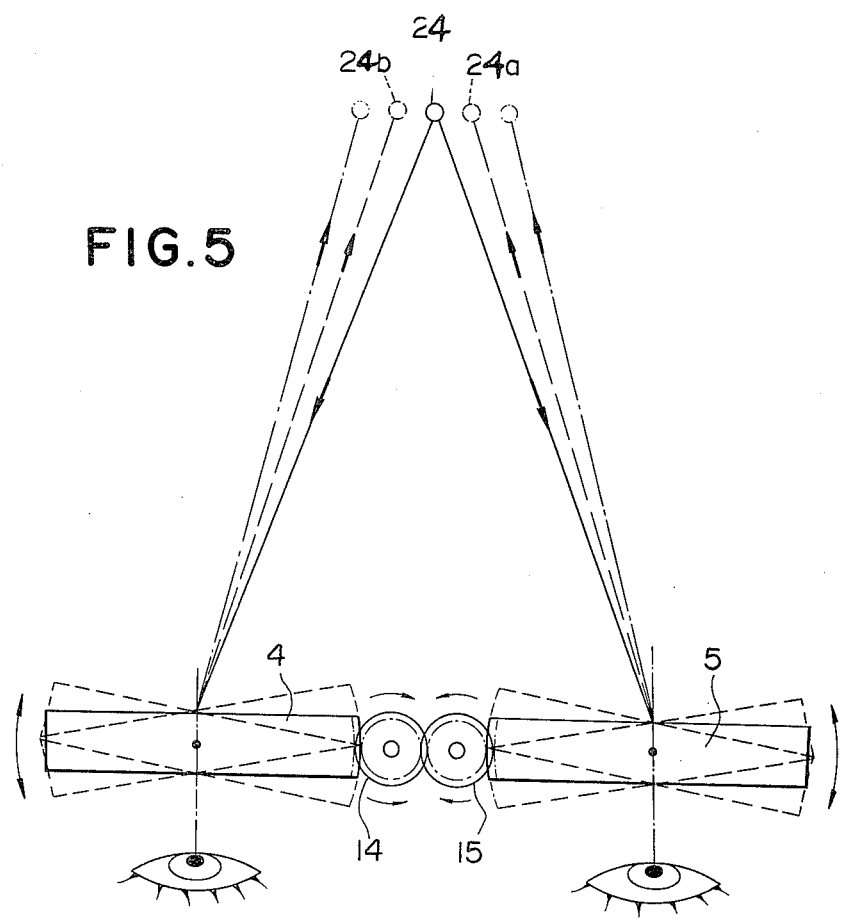
FIG. 5 is diagrammatic view showing the principle of operation of the spectacles of the present invention.

For example, if an object 24 is located at a position shown by the solid line in FIG. 5, the image thereof is projected directly into each of the two eyes of the observer from that position when the three-dimensional spectacles are not worn. However, when the spectacles are worn the light which passes though the refracting lenses 4 and 5 and is refracted thereby before passing into the eyes makes it appear as though the object 24 is being projected from position 24a to the right eye, and as though it were being projected from position 24b, which is symmetrical to the position of the object, to the left eye.

Also, when the index of refraction of the refracting lenses 4 and 5 is changed, i.e., when the right-left shift of the image seen by the two eyes is changed a perspective feeling is accordingly changed in the same manner as when the parallax is changed.

In other words, two-dimensional images can ordinarly only be recognized as two-dimensional images because the parallax between the two eyes does not exist, but by refracting the light that comes into each of the two eyes in a symmetrical manner, it is possible to produce a feeling as though there is a parallax between the eyes, and thus the two-dimensional images will appear to be three-dimensional, and a perspective feeling is gained by a change of difference in visual angles caused by a change of the refracting angle.

Accordingly, it is possible to make images projected by ordinary means appear to be three-dimensional without having to give the images special treatment or to prepare double images, and therefore the appearance of television or motion picture images can be improved.

Thus, although the structure of the present invention, in which a pair of refracting lenses are mounted on the spectacles frame in a manner such that the angle thereof can be freely changeable, is quite simple, it is possible to give more interest to two-dimensional images projected by ordinary means by making them appear to be three-dimensional.

What is claimed is:

1. Spectacles for giving a two-dimensional motion picture or television picture a three-dimensional appearance when worn in front of a wear's left and right eyes, said spectacles comprising a frame means for supporting a pair of lenses including a left lens and a right lens, means for shifting the image of the picture projected through the left lens to the right and the image of the picture projected through the right lens to the left, said image shifting means including a pair of refracting lenses including a left refracting lens and a right refracting lens, having respective first vertical axes located in the respective planes of said left and right refracting lenses, mounted on said frame means, for pivotal movement around said respective vertical axes and means, mounted to said frame means, for pivoting said pair of refracting lenses through equal angles around said respective vertical axes in opposite directions.

2. Spectacles as in claim 1 in which said frame means in a spectacle frame having two apertures therein for accomodating said pair of refracting lenses, and said spectacles further comprise lens frames in which said pair of refracting lenses are mounted and pins on the top and bottom of said lens frame pivotally mounted in said spectacle frame for pivotally supporting said lens frames in said spectacle frame, and said pivoting means comprising turning means, connected to the respective pins, for turning said pins for turning said pair of refracting lenses, and adjusting means, accessible to the wearer of the spectacles and connected to said turning means, for actuating said turning means.

3. Spectacles as in claim 2 in which said turning means comprises arms fixedly mounted on said pins with ends toward the center of the spectacle frame, each arm having a toothed wheel portion on the end toward the center of the spectacle frame and in spaced opposed relationship to the toothed wheel portion on the other arm; and a pair of toothed wheels rotatably mounted for rotation about second vertical axes on said spectacle frame between the ends of said arms having the toothed wheel portions thereon, said toothed wheels being meshed with each other, one being meshed with the toothed wheel portion on one arm and the other being meshed with the toothed wheel portion on the other arm; said adjusting means comprising an adjusting head pivotally mounted on said spectacle frame having a serrated end engagable by the finger of a wearer of the spectacles and having the other end engaged with the other end of one of said arms for pivoting said one of said arms when said head is pivoted.

4. Spectacles as claimed in claim 3 further comprising means for limiting the pivotal movement of said adjusting head for limiting the pivotal movement of said pair of refracting lenses.

5. Spectacles as claimed in claim 2, 3, or 4 further comprising bows hinged to said frame means.

6. Spectacles as claimed in claim 2, 3, or 4 further comprising clip means on said frame means for clipping said spectacles to conventional spectacles.

* * * * *